US006282409B1

(12) United States Patent
Frohlund

(10) Patent No.: US 6,282,409 B1
(45) Date of Patent: Aug. 28, 2001

(54) ARRANGEMENTS AND A METHOD RELATING TO AN APPARATUS CONTAINING ELECTRICAL CIRCUITRY

(75) Inventor: Stig Frohlund, Hässleholm (SE)

(73) Assignee: Telefonaktiebolaget LM Ericsson (SE)

( * ) Notice: Subject to any disclaimer, the term of this patent is extended or adjusted under 35 U.S.C. 154(b) by 0 days.

(21) Appl. No.: 09/216,640

(22) Filed: Dec. 18, 1998

(30) Foreign Application Priority Data

Dec. 19, 1997 (SE) .................................................. 9704763

(51) Int. Cl.⁷ .............................. H04B 1/38; H04M 1/00; G06F 19/00; H01R 4/66
(52) U.S. Cl. ........................... 455/90; 455/575; 379/433; 702/107; 439/105
(58) Field of Search .............................. 455/90, 550, 575, 455/348–350; 379/433, 431, 429, 428; 439/105, 31; 702/107, 85

(56) References Cited

U.S. PATENT DOCUMENTS

| 5,473,685 | 12/1995 | Mulder ................................. 379/387 |
| 5,537,472 | * 7/1996 | Estevez-Alcolado et al. ...... 379/433 |
| 5,572,223 | * 11/1996 | Phillips et al. ....................... 343/702 |
| 5,673,314 | * 9/1997 | Olkoski et al. ........................ 379/433 |
| 6,091,938 | * 7/2000 | Go ........................................... 455/90 |
| 6,178,388 | * 1/2001 | Claxton ................................. 702/107 |

FOREIGN PATENT DOCUMENTS

WO96/21988    7/1996    (WO) .

OTHER PUBLICATIONS

Landström. R., International–Type Search Report, Sep. 14, 1998, Search Request No. SE97/01562, pp. 1–3.

* cited by examiner

Primary Examiner—Tracy Legree
(74) Attorney, Agent, or Firm—Jenkens & Gilchrist

(57) ABSTRACT

It is shown a lid (100) at a portable device (150), as well as a portable device (150) having a lid (100), where said portable device (150) contains electrical device circuitry (151) within a device housing (152). The lid (100) comprises electrical lid circuitry (101), mechanical lid connection means (103) for enabling mechanical connection and disconnection to mechanical device connection means (153) of the device (150) that are accessible from without the housing (152). The lid (100) further comprises electrical lid connection means (102) for enabling electrical connection and disconnection to electrical device connection means (154) of the device (150) that are accessible from without the housing (152). The electrical lid circuitry (101) comprises electrical calibration means (104) that enable calibration of the electrical lid circuitry (101) to a predetermined calibration value as sensed at the electrical lid connection means (102).

17 Claims, 3 Drawing Sheets

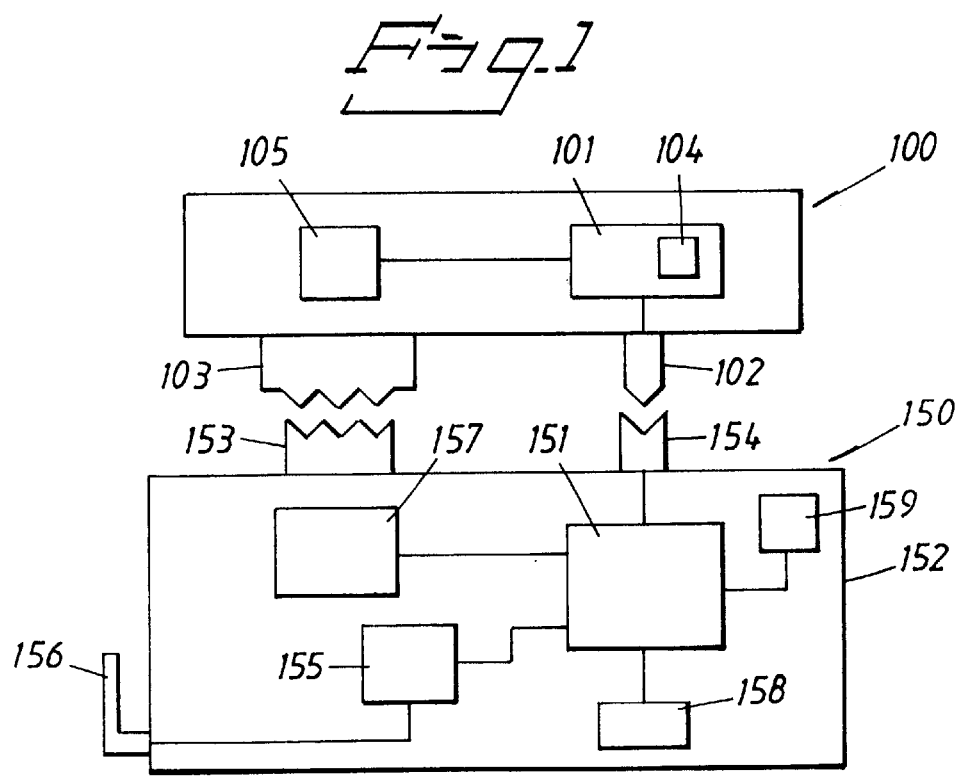

ARRANGEMENTS AND A METHOD RELATING TO AN APPARATUS CONTAINING ELECTRICAL CIRCUITRY

TECHNICAL FIELD OF THE INVENTION

The present invention relates to a lid of a portable electric device, said lid also comprising electric circuitry. In particular the invention relates to the lid itself as well as a portable device comprising the lid as well as a method of manufacturing the lid.

DESCRIPTION OF RELATED ART

The technical evolution, in terms of features such as weight and size, in the field of portable mobile telephone terminals has reached a point where physiognomic considerations must be made. Limitations in terms of size of previous generations of mobile terminals were dictated by the size of the components of the terminal, not least the size of the battery pack. Present day terminals, on the other hand, comprise a small number of highly integrated low-power circuits that easily fit inside a palm-sized unit. In fact the dimensions of the smaller among the recently developed terminals are such that the distance between the loudspeaker and the microphone has become an important design factor. In order to further miniaturize the terminals, while still enabling a proper alignment between the loudspeaker/microphone and the ear/mouth of the user, mechanical solutions such as foldable lids and arms comprising a microphone or a speaker have become commonplace.

A problem relating to the foldable and flip-lid equipped terminals is obviously their sensitivity to mechanical abuse. Both in terms of normal every day wear as well as occasional abuse due to carelessness on the side of the user. This problem has led to a requirement of replaceable lids of the terminals. A typical example of the state of the art in this respect is disclosed in the international patent application having publication number WO 96/21988. A portable radio with a detachable flip portion comprises a housing and a flip, each having electrical circuitry. The flip is rotatively mounted to the housing and the flip can be detached and reattached. Electrical coupling means on both flip and housing, that are freely separable from one another, allow electrical attachment and reattachment of the flip.

The arrangement disclosed in WO 96/21988 does not allow a user to replace a lid of the portable radio with any other lid while at the same time retaining electrical matching between the circuits of the lid and the radio.

SUMMARY OF THE INVENTION

In view of prior art as discussed above, a number of problems remain to be solved regarding attachable and detachable lids at portable electrical devices. Hence, a first problem solved by the present invention is how to provide a lid comprising electrical circuitry which is capable of being attached and detached to a portable electrical device while retaining an electrical match between the circuits of the lid and the device.

Another problem solved by the present invention is how to provide a portable electrical device with a replaceable lid containing electrical circuitry while retaining an electrical match between the circuits of the lid and the device.

Yet another problem solved by the present invention is how to provide a method of manufacturing a lid containing electrical circuitry which is electrically matched with respect to circuitry of a device to which the lid is to be attached.

The object of the present invention is to overcome the problems as stated above. This is achieved by providing a lid equipped with electrical circuitry, a portable electrical device comprising such a lid as well as a method of manufacturing the lid at a portable electrical device.

In short, the objects of the present invention is achieved by providing the lid containing electrical circuitry with an electrical calibration circuit capable of being calibrated to a predetermined calibration value suitable for enabling electrical connection to the portable electrical device. Further, a method of manufacturing the lid entails assembling the lid with its electrical circuitry and calibrating the circuitry to a predetermined calibration level.

In some more detail, it is shown a lid at a portable device, as well as a portable device having a lid, where said portable device contains electrical device circuitry within a device housing. The lid comprises electrical lid circuitry, mechanical lid connection means for enabling mechanical connection and disconnection to mechanical device connection means of the device that are accessible from without the housing. The lid further comprises electrical lid connection means for enabling electrical connection and disconnection to electrical device connection means of the device that are accessible from without the housing. The electrical lid circuitry comprises electrical calibration means that enable calibration of the electrical lid circuitry to a predetermined calibration value as sensed at the electrical lid connection means.

It is also shown a method of manufacturing such a lid at a portable device where the method comprises the steps of assembling the electrical lid circuitry to a lid base plate, and calibrating the electrical lid circuitry to a predetermined calibration value as sensed at the electrical lid connection means.

An advantage of the present invention is that a lid comprising electrical circuitry which is capable of being calibrated to a predetermined calibration value may be supplied as a replacement part to any portable device, without need for individual electrical calibration at the time of attachment to the device.

Another advantage of the present invention is that a manufacturer of lids may be alleviated of the responsibility of ensuring that the lid circuitry is correctly calibrated by the fact that the lid circuitry is calibrated in a separate step in the method of manufacturing the lid.

BRIEF DESCRIPTION OF THE DRAWINGS

FIG. 1 shows an exemplary schematic view of a lid comprising circuitry at an electrical device.

FIG. 2 shows an exemplary schematic diagram of electrical components connected in an electrical circuit.

DETAILED DESCRIPTION OF PREFERRED EMBODIMENTS

Figure 3:
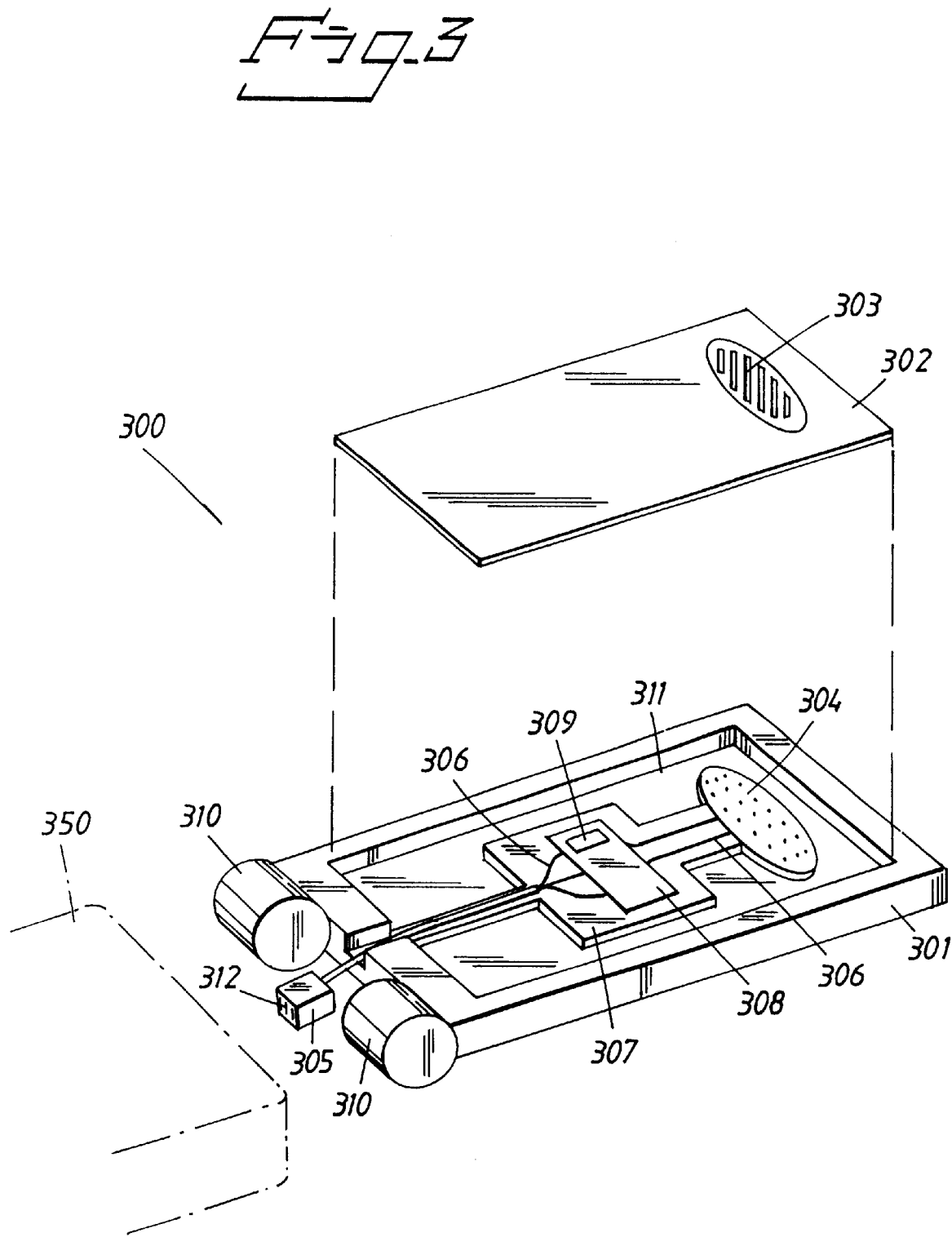
FIG. 3 shows an exemplary schematic view of a lid comprising electrical circuitry including a microphone.

FIG. 1 shows in an exemplary schematic way a first preferred embodiment of the present invention. A portable radio communication device 150 within a device housing 152, such as e.g. a mobile telephone, comprises electronic circuitry including a control unit 151. To the control unit 151 is connected a radio transceiver 155, including an antenna 156. Also connected to the control unit 151 is a display 157, a keypad 158 and a speaker 159. The circuitry which makes up these electrical units, possibly excepting the antenna 156, are located within the housing 152 of the device 150 and are thus not normally accessible to a user of the device. On the other hand, accessible from without the housing 152, as indicated in FIG. 1 by being sketched on the periphery of the housing 152, is a mechanical device connector 153 and an electric device connector 154.

FIG. 1 further shows a schematic view of a lid 100 intended for mechanical and electrical connection to the device 150 by means of a mechanical lid connector 103 and an electric lid connector 102. The lid 100 enables a user to cover the keyboard 158 of the device 150 by a simple folding/unfolding action. A detailed description of mechanical solutions of how this may be achieved, in terms of e.g. joints are known in the art and are thus outside the scope of the present invention. Preferably, the connector units 102, 103,153,154 enable the lid 100 to be mechanically and, electrically attachable and detachable to and from the device 150 without need for interference inside the device housing 152, as already shown in the prior art.

The lid 100 further comprises electric lid circuitry 101, including a calibration circuit 104 and a microphone 105. The microphone 105 detects sound emanating from a user of the device 150 and via the lid circuitry 101 transmits electrical signals representing the sound to the device 150, as already known in the art. The calibration circuit 104 of the lid circuitry 101 serves the purpose of providing an electrical match between the lid circuitry 101, including the microphone 105, and the circuitry in the device 150. The electrical characteristics of the microphone 105, i.e. correspondence between sound input and voltage output, is uncertain to a larger extent than uncertainties in the characteristics of the other parts of the lid circuitry 101. The purpose of the calibration circuit 104 is hence to enable a manufacturer of the lid 100 to ascertain that the electrical characteristics, as sensed at the electric lid connector 102 is at a predetermined value, expressed as e.g. an impedance level. Needless to say, the electrical connection between the lid circuitry 101 and the device circuitry 151 may comprise more than one electrical connection terminal. In fact, a usual configuration is three separate terminals, a signal terminal, a voltage supply terminal and a signal ground terminal. This is not shown in FIG. 1, purely for illustrative purposes, and will instead be described in connection with FIG. 2 below.

FIG. 2 shows in some detail an exemplary electric circuit, such as the lid circuitry 101 in FIG. 1 where all necessary electrical terminals are included. A voltage supply terminal 220, a signal terminal 221 and a signal ground terminal 222 form part of an electrical connector 250, such as e.g. the electrical lid connector 102 in FIG. 1. The signal terminal 221 is connected to a first microphone terminal 202 of a microphone 201. The signal ground terminal 222 is connected to a second microphone terminal 203 of the microphone 201. The voltage supply terminal 220 is connected via a calibration resistor 208 to the first microphone terminal 202. The calibration resistor 208 has an adjustable resistance level. Between the first microphone terminal 202 and the second microphone terminal 203 are a number of components connected in parallel. A zener diode 204, whose purpose is to protect the microphone 201 from potentially damaging voltage spikes, and three capacitors 205,206,207 with different capacitance levels, for removing unwanted radio frequency signals from the signal terminal 221.

As indicated above in connection with FIG. 1, the correspondence between sound input and voltage output from a microphone, is uncertain to a larger extent than uncertainties in the characteristics of the other parts in an electric circuit. The reason for this is that a microphone comprises a transforming interface in which variations in incoming mechanical energy, in the form of sound, is transformed into a variation in electrical characteristics of the microphone. That is, the so called response of the microphone may vary between individual specimens. In particular, as in the present example shown in FIG. 2, the sound variation is transformed into an impedance variation across the terminals 202,203 of the microphone 201. A current 260 flowing through the microphone 201, and the calibration resistor 208, is sensed at the signal terminal 221 as a varying voltage.

In order to enable a predetermined response, as sensed at the signal terminal, irrespective of which specimen of the microphone 201 is used, the calibration resistor 208 is adjusted to a resistance level, i.e. impedance level, which compensates for any deviation in microphone impedance.

The circuit shown in FIG. 2 is of course only one example of circuitry capable of being electrically calibrated. It is within the powers of a person skilled in the art to conceive of other circuits, comprising, e.g., only two terminals or having other calibration components with variable impedance than the resistor 208 in the current example.

FIG. 3 illustrates schematically an exemplary lid 300 at a portable device 350. A lid base plate 301 has a recess 311 in which is located a microphone 304 connected to lid circuitry 308 and an electric lid connector 305 which extends outside of the recess 311. In this example the lid circuitry 308 and connection leads 306 are located on a so called flex-film 307. However, other conventional means such as printed circuit boards and cabling may be utilized instead.

As in the previously described embodiment, the lid circuitry 308 comprises a calibration unit 309 which is adjusted in terms of impedance with respect to the characteristics of the microphone 304, as discussed above. The electric lid connector 305 is not shown in detail in FIG. 3, although it comprises three terminals 312 as described above in connection with FIG. 2.

To the lid base plate 301 are mechanical connectors 310 attached for enabling easy attachment and detachment to corresponding mechanical connectors (not shown in the figure) of the portable device 350. The mechanical connectors are not shown in detail since many different types exist within the known art and it is not the purpose of this disclosure to prescribe any particular solution. A lid cover 302 is mounted in the recess 311 of the lid base plate 301 and covers the microphone 304 and the lid circuitry 308. Holes 303 in the lid cover 302 allow sound to reach the microphone 304.

Figure 4:
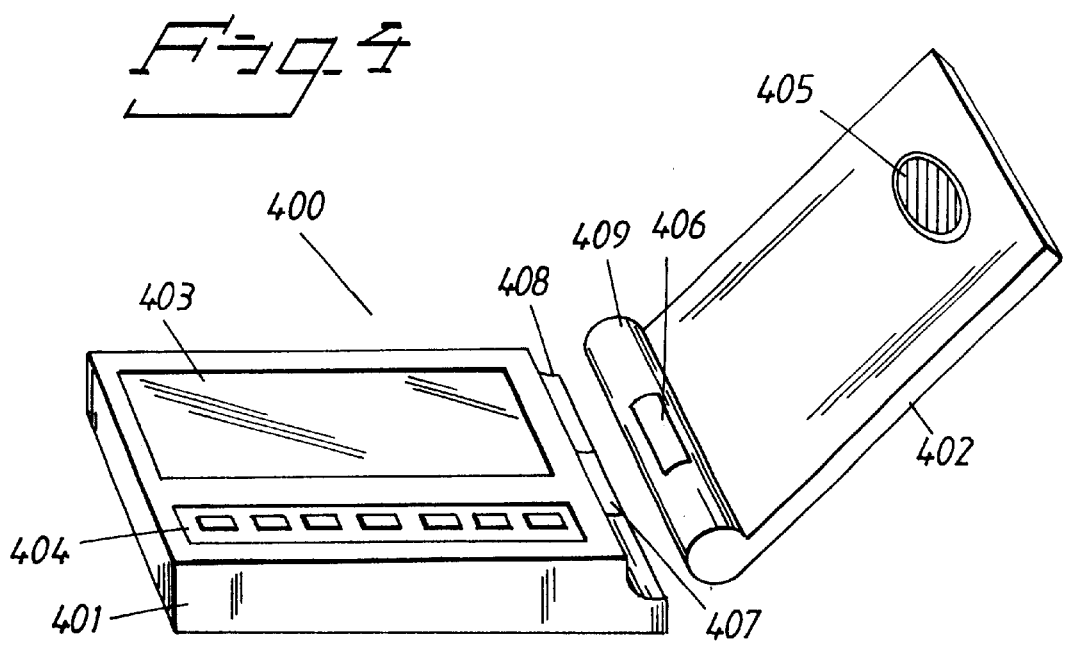
FIG. 4 shows an exemplary schematic view of a lid comprising a loudspeaker at a portable electrical device.

FIG. 4 shows an exemplary portable device 400 comprising a housing 401 and a lid 402. This example illustrates the advantage relating to the procedure of replacing a lid as discussed above.

Similar to previous examples, the device 401 in FIG. 4 comprises electric circuitry (not shown in FIG. 4), a display 403 and a keypad 404, a mechanical connector 408 and an electrical connector 407. A lid 402 comprises a microphone 405, electric circuitry (not shown in the figure) within the lid 402, a mechanical connector 409 and an electric connector 406.

The lid 402 is attachable and detachable via the mechanical connector 409 of the lid 402 to the device 401 via its mechanical connector 408. When mechanically attached to the device 401, the electric circuitry within the lid 402, including the microphone 405, is in electric contact with the circuitry of the device 401, as discussed above in connection with previous examples. The act of attaching and detaching the lid 402 entails a simple snap-action in order to interlock the respective mechanical connectors 408,409. Simultaneous with the mechanical connection, the electrical connection is established between the respective electric connectors 406,407.

By noting the fact that the electric circuitry within the lid 402 is calibrated in terms of an impedance level as sensed at the electric connector 406 of the lid 401, the advantage becomes clear that any lid 402 so calibrated will be suitable for connection with the device 401. That is, the lid 402 is easily replaceable and requires no electrical calibration of either lid 402 or device 401 when replacing the lid 402. This is of importance e.g. when a user himself/herself needs to replace a broken lid without having to seek assistance from specialized service personnel.

Figure 5:
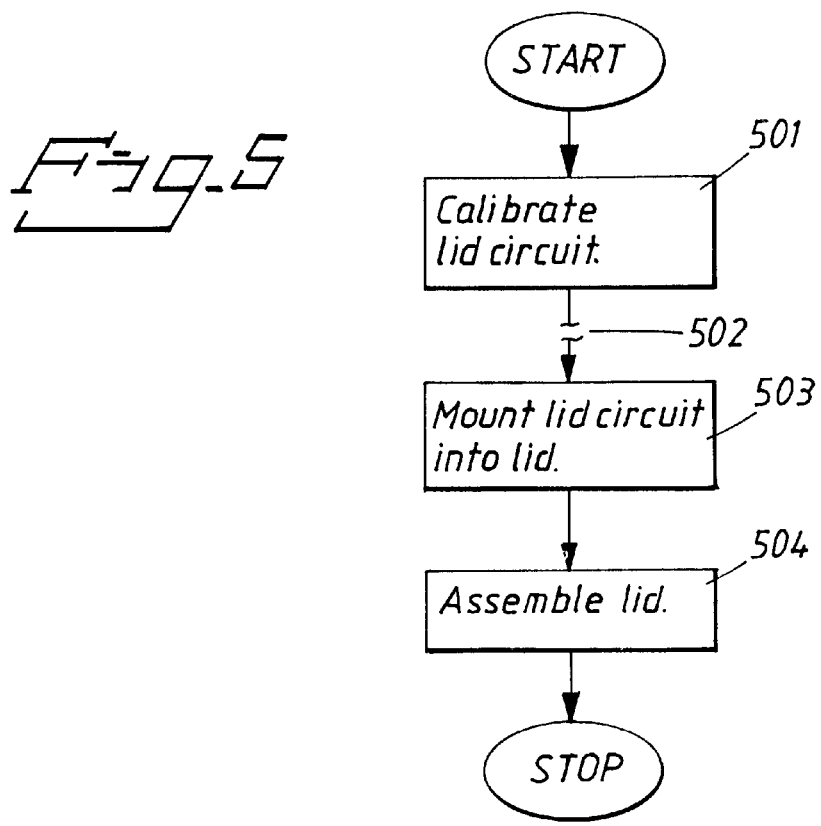
FIG. 5 shows an exemplary schematic view of a method of manufacturing a lid comprising electrical circuitry at an electrical device.

In FIG. 5 another advantage provided by the present invention is illustrated by an exemplary method of manufacturing a lid. A process of manufacturing a lid, such as e.g. a lid according to any of the examples shown above, at a portable device, such as e.g. a mobile telephone, includes a number of different sub-processes that require very different skills and equipment, not to mention differences in materials used. Preferred materials are obviously different synthetic plastics, although it should be pointed out that the invention is by no means restricted to any particular material. Nevertheless, for illustrative purposes it is in the following assumed that a plastic material is used.

The method commences with a calibration step 501, where an electric circuit such as the circuit 200 illustrated in FIG. 2 is assembled into one single unit. Preferably the circuit 200 is mounted onto flex-film material and connected with the microphone 201 and the electric connector 250. The circuit 200 is at this stage calibrated, by adjusting the resistance of the calibration resistor 208. This step 501 may be performed by a first manufacturer at a first place of manufacture and then delivered to a second manufacturer who will be responsible for the concluding part of the assembly of the lid.

This possibility of distributing the responsibility of separate steps of the method among different manufacturing parties is in FIG. 5 indicated by the broken part 502 of the flow chart.

In a mounting step 503, the already calibrated circuit 200 is mounted on a lid base-plate, such as the base-plate 301 illustrated in FIG. 3. The base-plate 301 is created according to known methods in the art of injection-molding, although other methods may of course be utilized. The circuitry is preferably placed in the recess 311 of the base-plate 301 and secured by e.g. means of gluing. The electric connector 305 is placed in such a position as to be accessible from without the lid 300 when assembled.

In a concluding step 504, the lid 300 is assembled by the act of e.g. welding the lid cover 302 onto the base-plate 301.

A lid 300 manufactured according to this method will then be available for delivery to both suppliers of portable devices 350 as well as users of such portable devices 350 who are in need of a replacement lid.

Although preferred implementations of the invention as described above are in connection with mobile telephones having microphone-equipped lids, it is obviously within the knowledge of a person skilled in the art to implement it in connection with other types electronic equipment. Examples such as portable radio receivers and tape recorders springs readily to mind. Furthermore, the circuitry comprised in the lid of the device may, in light of these other examples include other components that may call for individual calibration of each lid, such as a loudspeaker.

What is claimed is:

1. A lid for a portable device, the portable device containing electrical device circuitry at least substantially within a device housing, comprising:
   electrical lid circuitry;
   mechanical lid connection apparatus for enabling mechanical connection and disconnection to mechanical device connection apparatus of the portable device, the mechanical device connection apparatus being accessible from outside the device housing;
   electrical lid connection apparatus for enabling electrical connection and disconnection to electrical device connection apparatus of the portable device, the electrical device connection apparatus being accessible from outside the device housing; and
   wherein said electrical lid circuitry includes electrical calibration circuitry, including a calibration sensing component and an element made to have an adjustable characteristic which can be adjusted and set to a predetermined calibration value as measurable at said calibration sensing component.

2. The lid according to claim 1, wherein the lid includes a microphone and wherein said electrical calibration circuitry comprises an impedance network, which can be calibrated based on characteristics of said microphone.

3. The lid according to claim 2, wherein said impedance network comprises at least one resistor with adjustable resistance, and wherein said calibration sensing component comprises terminals.

4. The lid according to claim 1, wherein said electrical lid circuitry comprises a microphone.

5. The lid according to claim 1, wherein said electrical lid circuitry comprises a loudspeaker.

6. The lid according to claim 1, wherein said electrical lid circuitry comprises flex film circuitry.

7. The lid according to claim 1, wherein the portable device is a mobile telephone.

8. An electronic device having a member at least removably attached thereto, the electronic device containing electrical device circuitry at least substantially within a device housing, comprising:
   electrical member circuitry;
   a mechanical connection mechanism of the member, said mechanical connection mechanism of the member adapted to enable mechanical connection and disconnection to a mechanical connection mechanism of the electronic device, the mechanical connection mechanism of the electronic device being accessible from outside the device housing;
   an electrical connection mechanism of the member, said electrical connection mechanism of the member adapted to enable electrical connection and disconnection to an electrical connection mechanism of the electronic device, the electrical connection mechanism of the electronic device being accessible from outside the device housing; and
   wherein said electrical member circuitry comprises at least one electrical calibration circuit including a calibration sensing component and an element made to have an adjustable characteristic which can be adjusted and set to a predetermined calibration value as measurable at said calibration sensing component.

9. The electronic device according to claim 8, including a microphone, wherein said at least one electrical calibration circuit element comprises an impedance network, which can be calibrated based on characteristics of said microphone.

10. The electronic device according to claim 9, wherein said impedance network comprises at least one resistor with adjustable resistance, and wherein said calibration sensing component comprises terminals.

11. The electronic device according to claim 8, wherein said electrical member circuitry comprises a microphone.

12. The electronic device according to claim 8, wherein said electrical member circuitry comprises a loudspeaker.

13. The electronic device according to claim 8, wherein said electrical member circuitry comprises flex film circuitry.

14. The electronic device according to claim 8, wherein the electronic device is a mobile telephone.

15. A method for manufacturing a lid for a portable device having electrical device circuitry, comprising the steps of:

assembling electrical lid circuitry to at least one lid base;

assembling the electrical lid circuitry to electrical lid connection apparatus, the electrical lid connection apparatus enabling electrical connection between at least the electrical lid circuitry and the electrical device circuitry of the portable device; and calibrating the electrical lid circuitry to a predetermined calibration value as measurable at the electrical lid connection apparatus by measuring the calibration value by using an element which is made to have an adjustable characteristic which can be adjusted and set.

16. The method according to claim 15, wherein said step of calibrating the electrical lid circuitry further comprises the step of adjusting an impedance.

17. The method according to claim 16, wherein said step of adjusting an impedance further comprises the step of adjusting a resistance.

* * * * *